(12) United States Patent
Pollak et al.

(10) Patent No.: US 7,398,706 B2
(45) Date of Patent: Jul. 15, 2008

(54) GEARBOX ACTUATOR COMPRISING A BEARING FOR THE GEARSHIFT RAILS

(75) Inventors: Burkhard Pollak, Buhl (DE); Terry Morgan, Leamington Spa (GB); James Antony Lethbridge, Warwickshire (GB); Ian Richard Joseph Bates, West Yorkshire (GB)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/711,823

(22) Filed: Oct. 7, 2004

(65) Prior Publication Data

US 2005/0103145 A1 May 19, 2005

Related U.S. Application Data

(63) Continuation of application No. PCT/DE03/01195, filed on Apr. 10, 2003.

(30) Foreign Application Priority Data

Apr. 10, 2002 (DE) ............................. 102 15 715
Sep. 5, 2002 (DE) ............................. 102 41 068

(51) Int. Cl.
B60K 20/00 (2006.01)
F16H 59/04 (2006.01)

(52) U.S. Cl. .......................... 74/473.36; 74/479.01

(58) Field of Classification Search .......... 74/606 R, 74/473.11, 473.12, 473.36, 335, 471 XY, 74/479.01
See application file for complete search history.

(56) References Cited

U.S. PATENT DOCUMENTS

| | | | | |
|---|---|---|---|---|
| 4,584,895 A | | 4/1986 | Holmes | |
| 4,873,881 A | * | 10/1989 | Edelen et al. | 74/336 R |
| 4,911,031 A | * | 3/1990 | Yoshimura et al. | 74/335 |
| 5,146,806 A | * | 9/1992 | Doster et al. | 74/473.26 |
| 5,315,218 A | * | 5/1994 | Fortune et al. | 318/54 |
| 5,408,898 A | * | 4/1995 | Steeby et al. | 74/473.1 |
| 5,468,197 A | * | 11/1995 | Loeffler | 477/99 |
| 5,816,101 A | * | 10/1998 | Weston | 74/331 |
| 5,910,068 A | | 6/1999 | Krauss et al. | |
| 6,026,698 A | * | 2/2000 | Weston | 74/335 |
| 6,082,215 A | * | 7/2000 | Jerwick | 74/473.25 |

(Continued)

Primary Examiner—Richard W L Ridley
Assistant Examiner—James Pilkington
(74) Attorney, Agent, or Firm—Simpson & Simpson, PLLC

(57) ABSTRACT

A gearbox actuator comprising a selector shaft 2 which is arranged in a housing and is driven by a drive. A shift finger 3 and disengaging shaped elements 4 used to actuate gearshift rails are arranged on the selector shaft, and jibs for 12-15 supporting and guiding the gearshift rails are arranged on the housing. The gearbox actuator 1 comprises the central selector shaft 2 mounted in bearing elements 19 and comprises a shift finger 3 and two disengaging shaped elements 4 arranged in the center thereof, at a distance corresponding to the width of a channel. Preferably, the selector shaft 2 is driven by a brushless motor 5 by means of a double planetary stage 6 and a toothed segment 7 which engages a toothed wheel 16 that is preferably positioned in a housing element 17. A preferably second brushless motor 8 drives a sliding element 37 by means of spindle 9, the sliding element displacing the shift finger 3 and the disengaging shaped elements 4 on the selector shaft 2.

6 Claims, 2 Drawing Sheets

U.S. PATENT DOCUMENTS

| | | |
|---|---|---|
| 6,276,224 B1 | 8/2001 | Ueda et al. |
| 6,321,615 B1 * | 11/2001 | Jerwick .................. 74/473.25 |
| 6,374,686 B1 * | 4/2002 | Weston ........................ 74/335 |
| 7,093,511 B2 | 8/2006 | Norum et al. |

* cited by examiner

| # GEARBOX ACTUATOR COMPRISING A BEARING FOR THE GEARSHIFT RAILS

CROSS-REFERENCE TO RELATED APPLICATIONS

This application is filed under 35 U.S.C. §120 and §365(c) as a continuation of International Patent Application PCT/DE03/01195, filed Apr. 10, 2003, which application is incorporated herein by reference. This application also claims priority of German Patent Applications 102 15 715.4, filed Apr. 10, 2002 and 102 41 068.2, filed Sep. 5, 2002, which applications are incorporated herein by reference.

BACKGROUND OF THE INVENTION

This invention relates to a gearbox actuator with a selector shaft, arranged in a housing and driven by a drive upon which are attached a shift finger and disengaging shaped elements that operate the gearshift rails.

Usually, the gearshift rails of a gearbox actuator are made of sheet metal and are placed in bearings on both their ends. One problem consists in the following—in case of larger or longer gears, the gearshift rails are subjected to a relatively softly bending bearing.

OBJECT OF THE INVENTION

The object of this invention is to design a gearbox actuator such that the gearshift rails will be positioned relatively resistant to bending.

BRIEF SUMMARY OF THE INVENTION

This problem is solved by a gearbox actuator with a selector shaft that is driven by a drive and that is arranged in a housing upon which are attached a shift finger and disengaging shaped elements that operate the gearshift rails, whereby, arranged on the housing, is a bearing arrangement that supports and guides the gearshift rails between it.

The essential advantage of the invention consists in the following: By means of an additional bearing or bearing arrangement of the gearbox actuator, the gearshift rails can be preferably supported in the middle so that they will be positioned in a relatively bending resistant manner. This is why one can prevent undesirable and damaging shifts of the gearshift rails, such that they can be caused by vibrations and impacts.

The bearing arrangement is designed in a particularly simple and advantageous manner by jibs arranged on the housing that support and guide the gearshift rails between them.

In a particularly preferred manner, the housing of the gearbox actuator comprises an attachment part by means of which it can be attached on a gearbox housing of a gearbox in such a way that the jibs protrude through an opening or recess in the gearbox housing into said housing in order to be able to receive the gearshift rails. The attachment part and the jibs in a practical manner have the shape of an injection-molding part.

To support and guide the gearshift rails in a particularly effective manner, one of the embodiments of the invention features two upper jibs and two lower jibs that are opposite each other with respect to the selector shaft. Only two jibs are provided in a preferred manner in a simpler embodiment. The four or two jibs are placed preferably symmetrically opposite each other with respect to the selector shaft.

To facilitate a particularly frictionless and also relatively wear-resistant engagement of the jibs on the slide rails, the jibs preferably have guide shoe parts on the terminal areas that rest against the gearshift rails.

BRIEF DESCRIPTION OF THE DRAWINGS

The invention and its embodiments will be explained in greater detail below in conjunction with the figures, wherein.

DETAILED DESCRIPTION OF THE INVENTION

Figure 1:
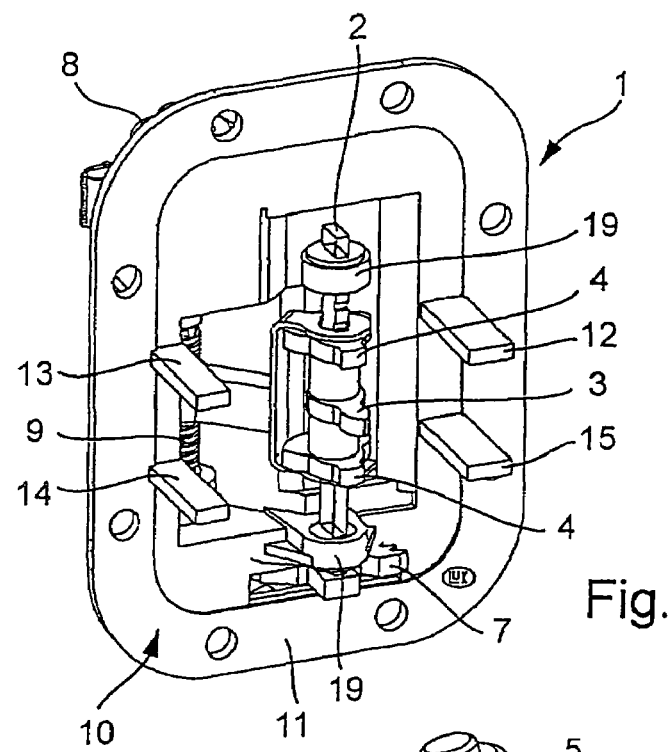
FIG. 1 is a three-dimensional illustration of a gearbox actuator.

Gearbox actuator 1 in the known manner comprises a central selector shaft 2 that is positioned in bearing parts 19 and that, for example, in the middle, has a shift finger 3 and two disengaging shaped elements 4, 4 that are arranged at an interval corresponding to the width of one gap width. Selector shaft 2 is preferably driven by a brushless motor 5 via a double planetary stage 6 and a toothed segment 7 that preferably engages a toothed wheel 16 that is positioned in a housing part 17. A preferably second brushless motor 8 via a spindle 9 drives a sliding element 37 that shifts the shift finger 3 and the disengaging shaped elements 4, 4 on selector shaft 2. The structure of this known gearbox actuator 1 can be seen particularly clearly in the exploded view shown in FIG. 2.

Figure 2:
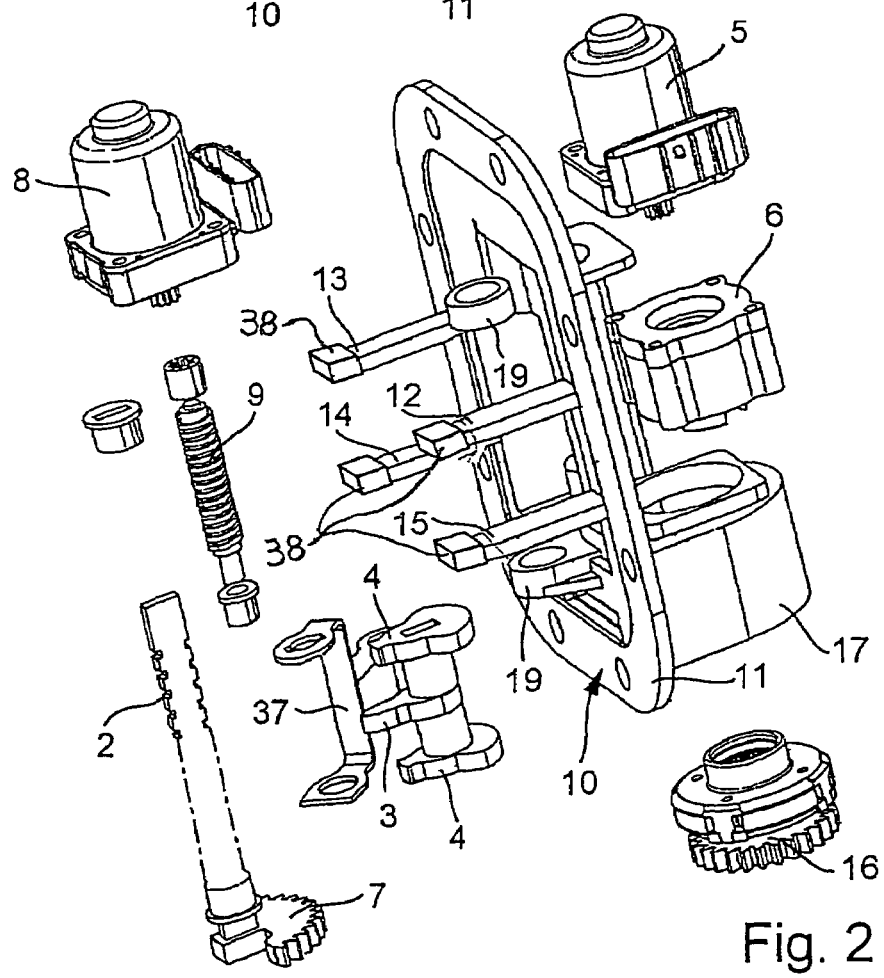
FIG. 2 is an exploded view of the gearbox actuator in FIG. 1.

In FIGS. 1 and 2, the housing of gearbox actuator 1 is labeled 10. It has a preferably plate-shaped or flange-shaped attachment part 11 with which it is attached upon a gear (not shown). Housing 10 has a bearing arrangement for the gearshift rails that preferably comprises two upper jibs 12, 13 as well as two lower jibs 14, 15 that preferably protrude from attachment part 11 into the gear and that between themselves guide and support the packet of gearshift rails. Preferably, the upper and lower jibs 12, 13, 14, 15 are symmetrically opposite each other with respect to the selector shaft 2. It is also conceivable that one would provide only two jibs in a simplified embodiment of the invention in place of the previously explained four jibs. In a particularly preferred manner, housing 10, attachment part 11, bearings 19 and jibs 12 to 15 involve an injection-molding part that can possibly also comprise the housing part 17. According to a development of the invention, guide shoe parts can be arranged at the ends of jibs 12 to 15 on the contact surfaces toward the gearshift rails, which guide shoe parts preferably are made of plastic and can be clipped on. Such a guide shoe part is illustrated in the form of a diagram in FIG. 2 and is labeled 38.

Figure 3:
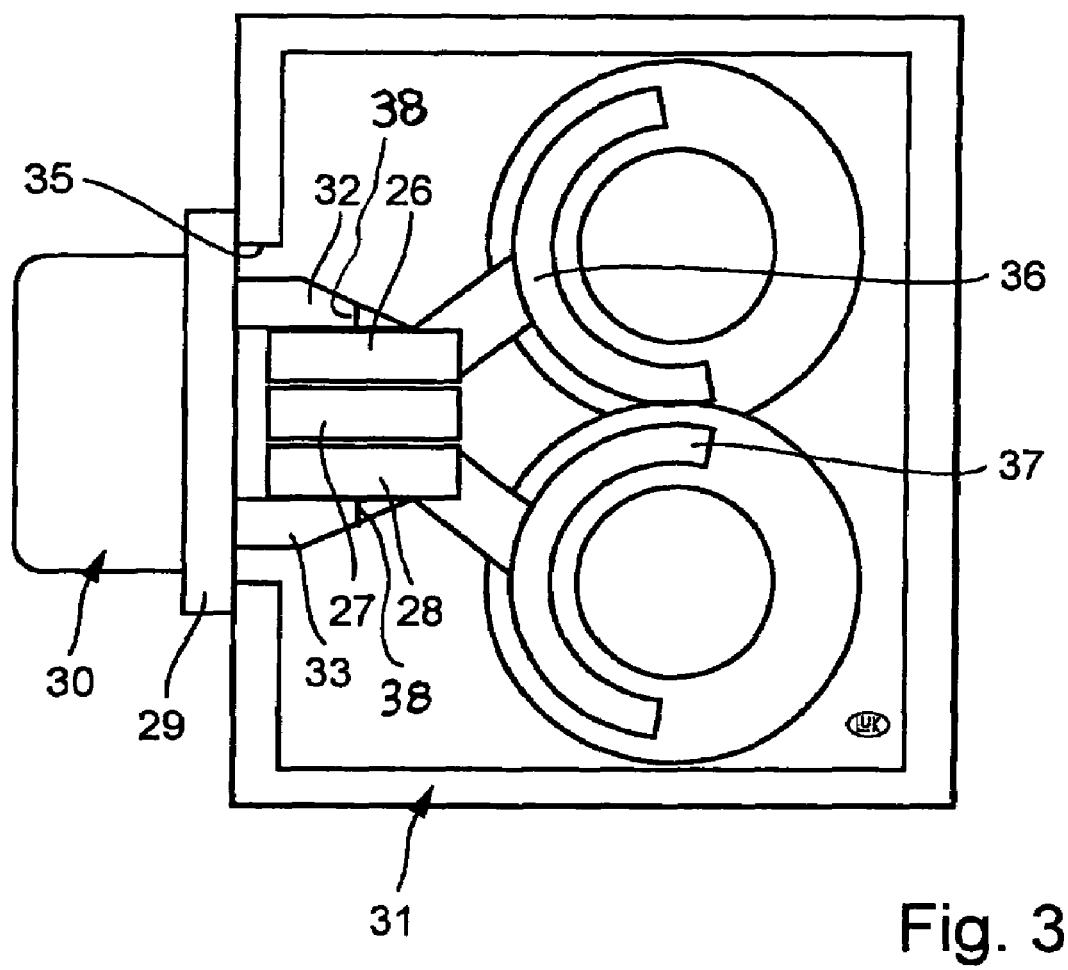
FIG. 3 is a development of the invention.

FIG. 3 shows a development of the invention where an additional support for gearshift rails 26, 27, 28 is arranged on a housing of a gearbox actuator 30 in order to diminish or prevent shifts of the gearshift rails 26, 27, 28 that can be traced back to vibrations and impacts. An advantageous feature is represented here by the fact that the additional support does not make the construction of the housing any more complicated.

In FIG. 3, the gearbox housing of the gear, preferably a double clutch gear, is labeled 31. After it has been assembled, gearbox actuator 30 is placed upon gearbox housing 31 and is attached upon it, i.e., it is screwed together with it. On its side facing toward the gearbox housing, gearbox actuator 30 has at least two supporting rails or jibs 32, 33 for support purposes, which support rails or jibs, preferably starting from a flange or attachment part 29 with which the gearbox actuator 30 is attached upon the gearbox housing 31, protrude through an opening 35 of same into the interior of the gearbox housing 31. Between them, these jibs 32, 33 receive the packet of gearshift rails 26, 27, 28 that are connected with gearshift forks 36, 37.

During the shifting process, the gearshift rails 26, 27, 28 are guided and supported between jibs 32, 33. As the gearbox actuator 30 is attached upon gear housing 31, the additional jibs 32, 33 do not represent any impairments because they are simply inserted through the opening 35 of the gear housing 31 in order between them to receive gearshift rails 26, 27 and 28.

The patent claims submitted with the application are formulation proposals without regard to the attainment of additional patent protection. Applicant reserves the right to claim additional feature combinations that are so far disclosed only in the description and/or drawings.

References, used in the subclaims, point to the additional development of the object of the main claim by means of the features of the particular subclaim; they are not to be understood as a waiver of the attainment of an independent, objective protection for the feature combinations of the referenced subclaims.

The object of the subclaims can form separate and independent inventions with a view to the state of the art on the priority date; therefore, applicant reserves the right to make them into an object of independent claims or partial declarations. They can furthermore also contain independent inventions that display a design independent of the objects of the preceding subclaims.

The exemplary embodiments are not to be construed as a restriction of the invention. Instead, numerous changes and modifications are possible in the context of the disclosure on hand, especially those variants, elements and combinations and/or materials that, for example, by combination or modification of individual features or elements or process steps in conjunction with those described in the general description and embodiments as well as the claims and contained in the drawings, can be preferred by the expert with a view to the solution of the problem and that by means of features that can be combined lead to a new object or to new process steps or new process step sequences also to the extent that they relate to production, testing and working processes.

What is claimed is:

1. A gearbox actuator comprising:
   a gearbox actuator housing;
   a drive unit;
   a single selector shaft; and,
   a bearing arrangement operatively arranged to support gearshift rails;
   wherein said single selector shaft comprises a shift finger and disengaging elements, said single selector shaft is driven by said drive unit and is arranged in said gearbox actuator housing, and said shift finger and disengaging elements are arranged to operate the gearshift rails, wherein said bearing arrangement comprises protruding rods that support the gearshift rails, and wherein the protruding rods include first and second upper protruding rods and first and second lower protruding rods, said first and second upper protruding rods arranged opposite each other with respect to the selector shaft, and said first and second lower protruding rods arranged opposite each other with respect to the selector shaft.

2. The gearbox actuator according to claim 1, wherein the gearbox actuator housing comprises an attachment part operatively arranged to be attached to a gear housing of a gearbox where said protruding rods protrude through an opening or recess in the gear housing into the gear housing.

3. The gearbox actuator according to claim 1, wherein the attachment part and the protruding rods are manufactured as an injection molded part.

4. The gearbox actuator according to claim 1, wherein the housing, the bearing arrangement for the selector shaft and the protruding rods are made as an injection molded part.

5. A gearbox actuator comprising:
   a gearbox actuator housing;
   a drive unit;
   a single selector shaft; and,
   a bearing arrangement operatively arranged to support gearshift rails;
   wherein said single selector shaft comprises a shift finger and disengaging elements, said single selector shaft is driven by said drive unit and is arranged in said gearbox actuator housing, and said shift finger and disengaging elements are arranged to operate the gearshift rails, wherein said bearing arrangement comprises protruding rods that support the gearshift rails, and wherein the protruding rods include first and second upper protruding rods and first and second lower protruding rods, said first and second upper protruding rods arranged symmetrically opposite each other with respect to the selector shaft, and said first and second lower protruding rods arranged symmetrically opposite each other with respect to the selector shaft.

6. A gearbox actuator comprising:
   a gearbox actuator housing;
   a drive unit;
   a single selector shaft; and,
   a bearing arrangement operatively arranged to support gearshift rails;
   wherein said single selector shaft comprises a shift finger and disengaging elements, said single selector shaft is driven by said drive unit and is arranged in said gearbox actuator housing, and said shift finger and disengaging elements are arranged to operate the gearshift rails, wherein said bearing arrangement comprises protruding rods that support the gearshift rails, and wherein the protruding rods have guide shoe parts at their ends resting against the gearshift rails.

* * * * *